United States Patent [19]

Fejer et al.

[11] Patent Number: 5,048,905

[45] Date of Patent: Sep. 17, 1991

[54] WAVEGUIDE PHASEMATCHING

[75] Inventors: Martin M. Fejer; Eric J. Lim, both of Menlo Park, Calif.

[73] Assignee: The Board of Trustees of the Leland Stanford University, Stanford, Calif.

[21] Appl. No.: 500,033

[22] Filed: Mar. 27, 1990

[51] Int. Cl.[5] .................................................. G02B 6/10
[52] U.S. Cl. .............................. 350/96.12; 350/96.13; 350/96.14
[58] Field of Search ............... 350/96.12, 96.13, 96.14, 350/96.15, 96.30, 96.31, 96.32, 96.33, 96.34, 355; 372/21

[56] References Cited

U.S. PATENT DOCUMENTS

| | | | |
|---|---|---|---|
| 3,384,433 | 5/1968 | Bloembergen | 350/150 |
| 4,093,345 | 6/1978 | Logan et al. | 350/355 |
| 4,146,297 | 3/1979 | Alferness et al. | 350/96.14 |
| 4,273,411 | 6/1981 | Alferness | 350/96.14 |
| 4,925,263 | 5/1990 | Sandford et al. | 372/21 X |

OTHER PUBLICATIONS

W. K. Burns, et al., "Noncritical' Phase Matching in Optical Waveguides", Appl. Phys. Lett., vol. 22, No. 4, 15 Feb. 1973, pp. 143–145.

W. K. Burns, et al., "Observation of Noncritically Phase-Matched Second-Harmonic Generation in an Optical Waveguide", Appl. Phys. Lett., vol. 24, No. 5, 1 Mar. 1974, pp. 222–224.

George I. Stegeman, et al., "Nonlinear Integrated Optics", J. Appl. Phys. 58(12), 15 Dec. 1985, pp. R57–R78.

Primary Examiner—William L. Sikes
Assistant Examiner—Phan T. Heartney
Attorney, Agent, or Firm—Flehr, Hohbach, Test, Albritton & Herbert

[57] ABSTRACT

A method of fabricating a waveguide is described minimizing to a desired degree the effect of minor variations caused, for example, during manufacture from an ideal dimension to obtain a coupling of energy between two different frequencies of optical radiation propagated in the waveguide.

6 Claims, 8 Drawing Sheets

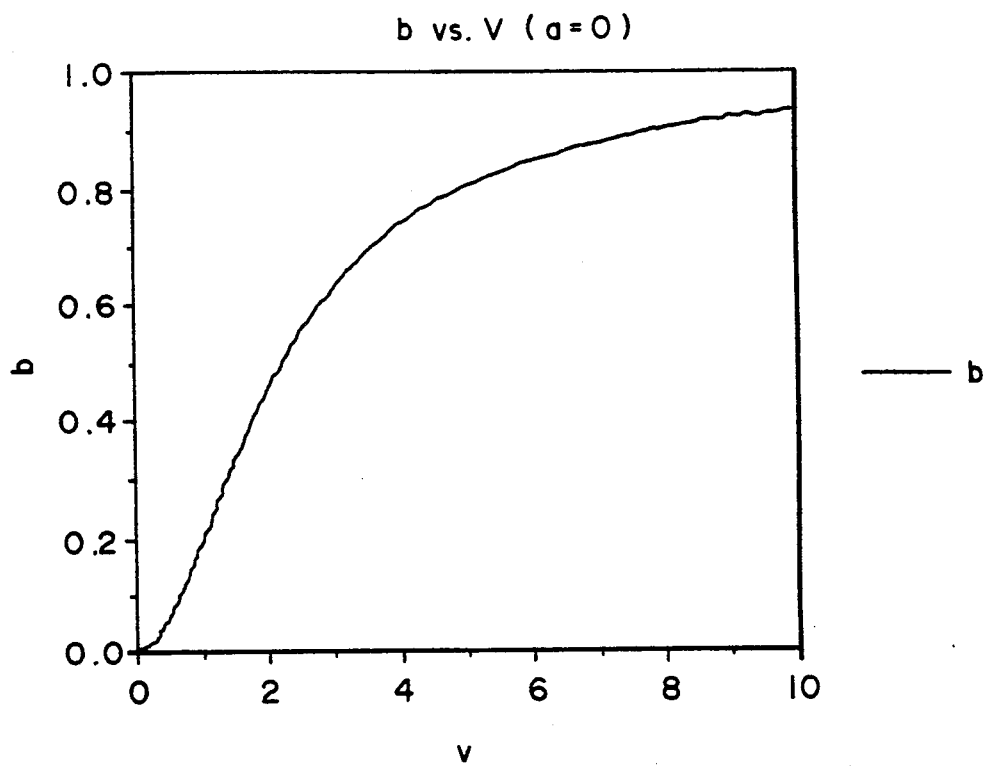
FIG.—1
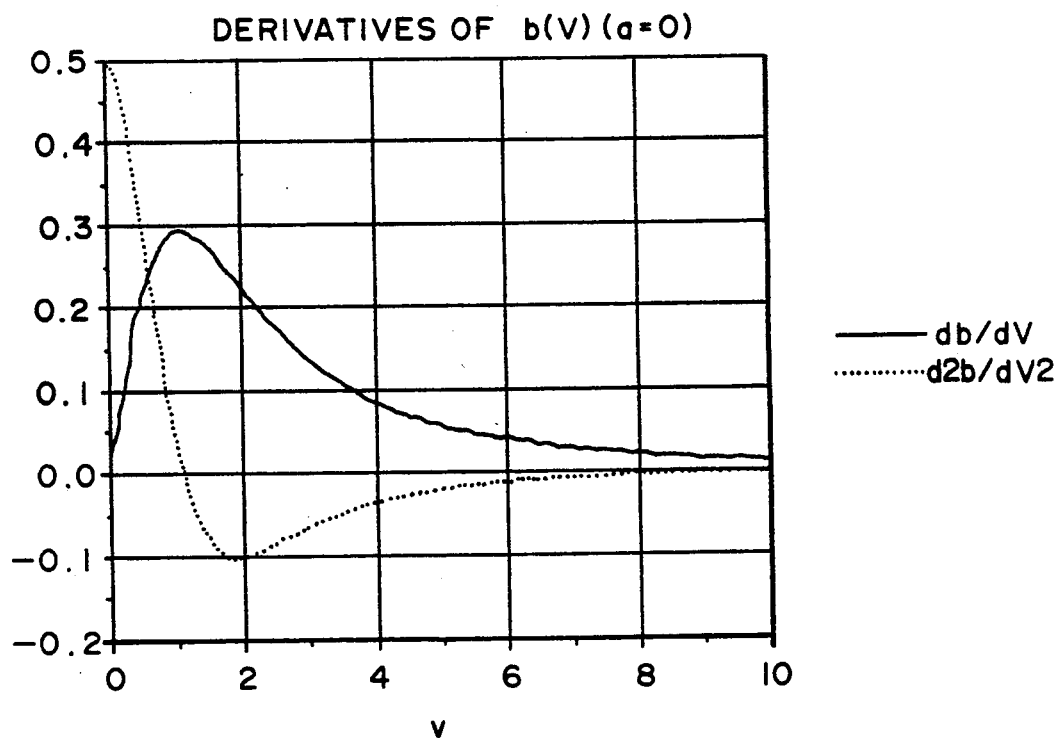
FIG.—2

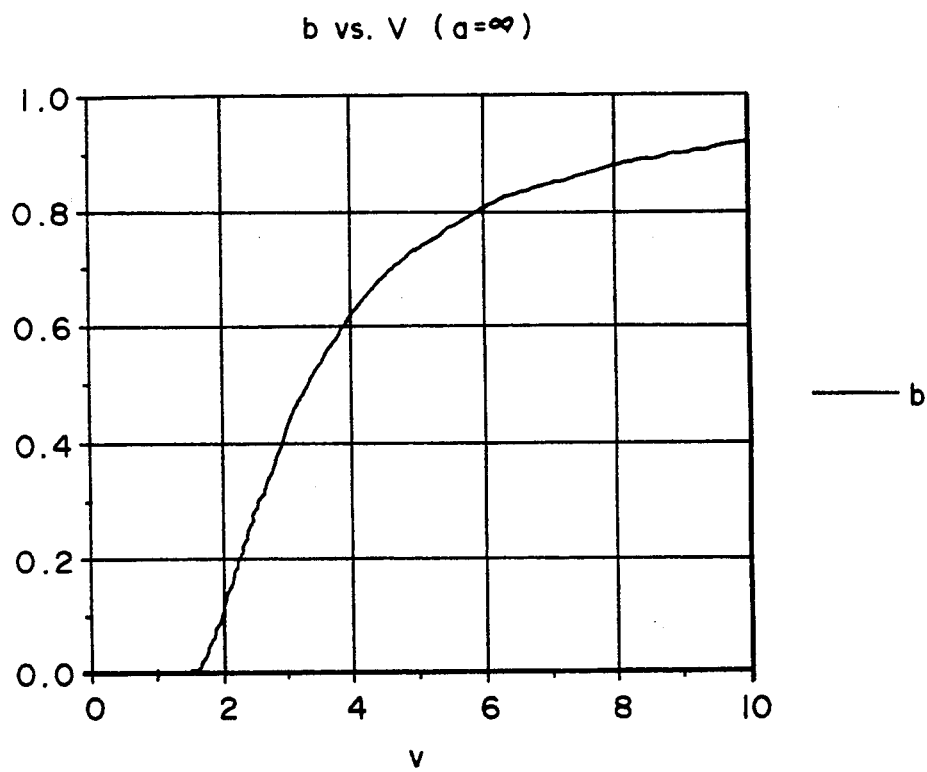
FIG.—3
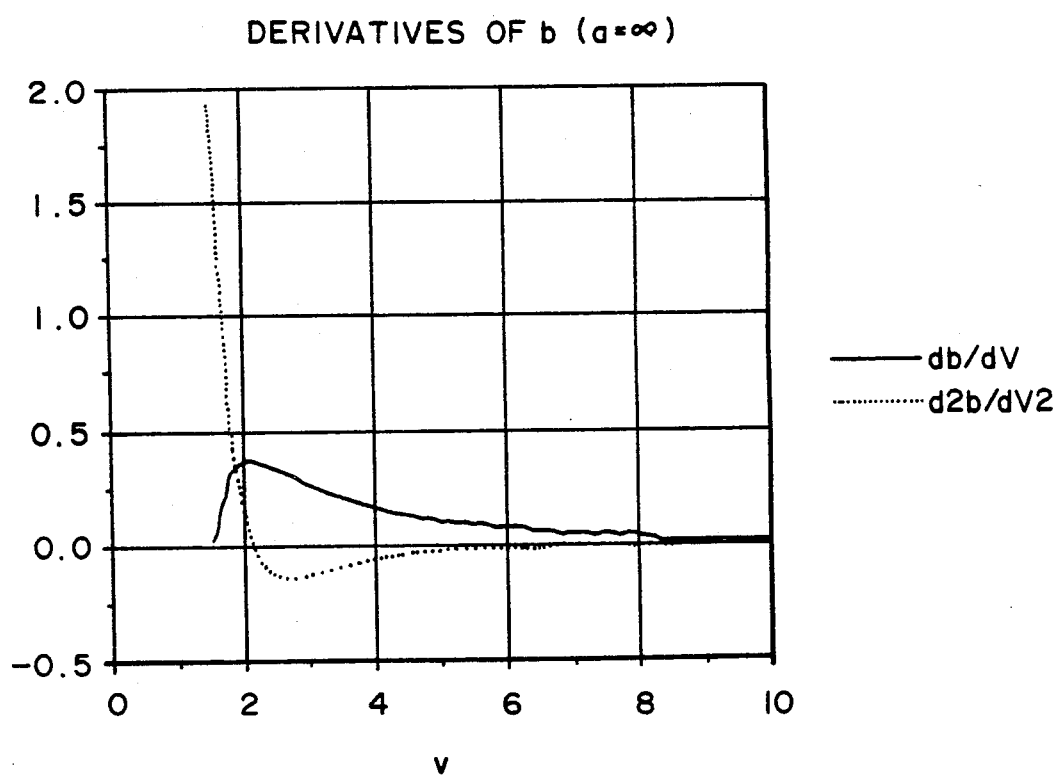
FIG.—4

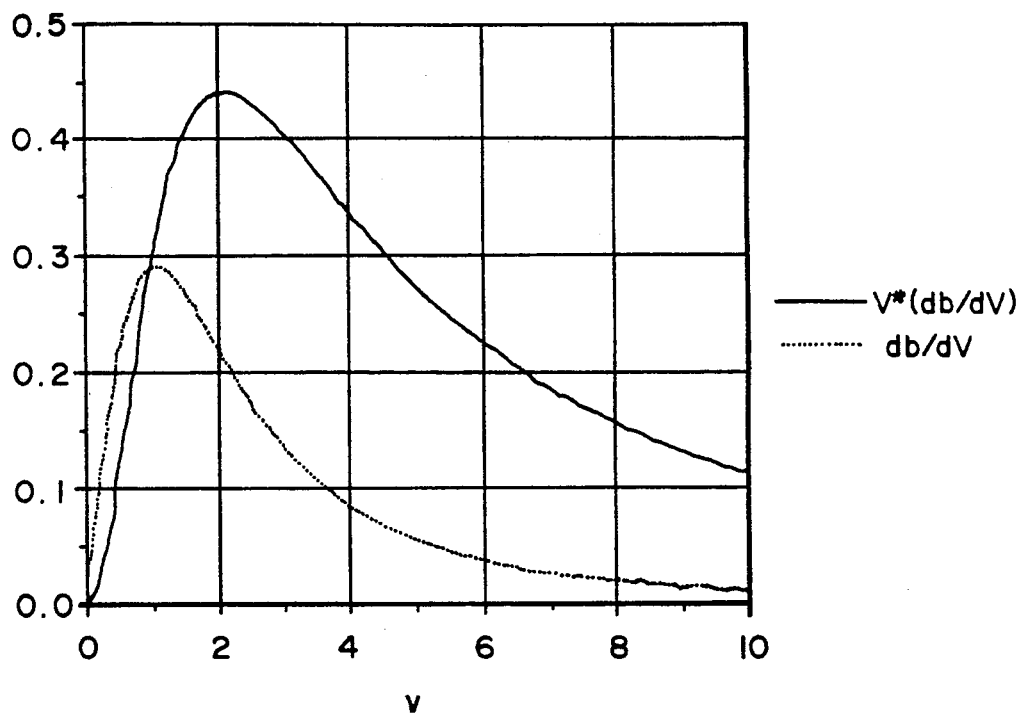
FIG.—5
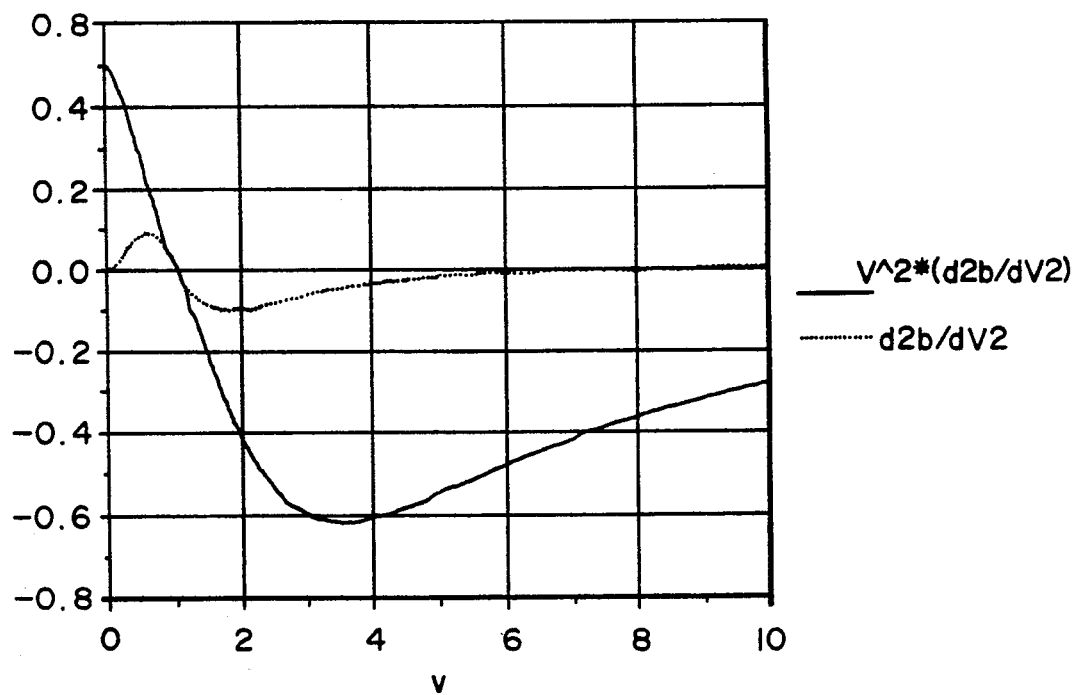
FIG.—6

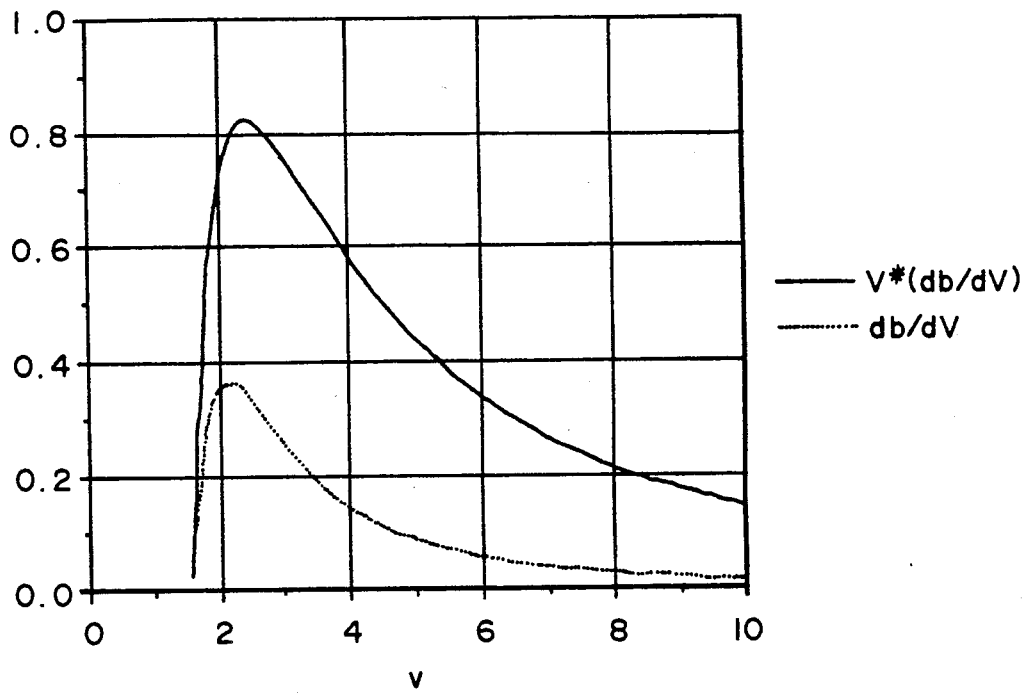
FIG.—7
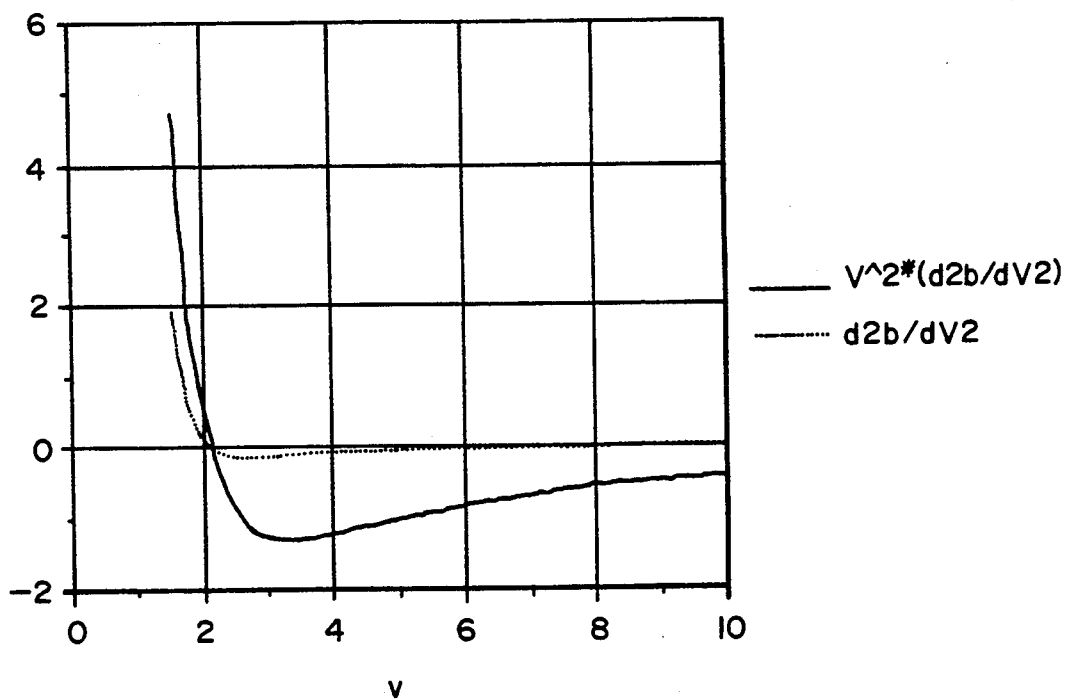
FIG.—8

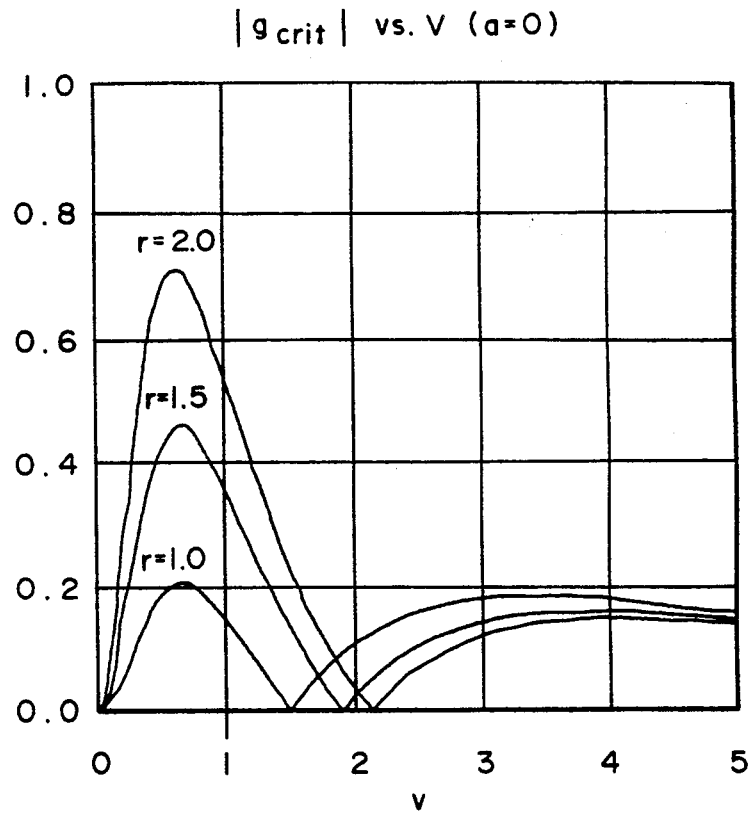
FIG.—9
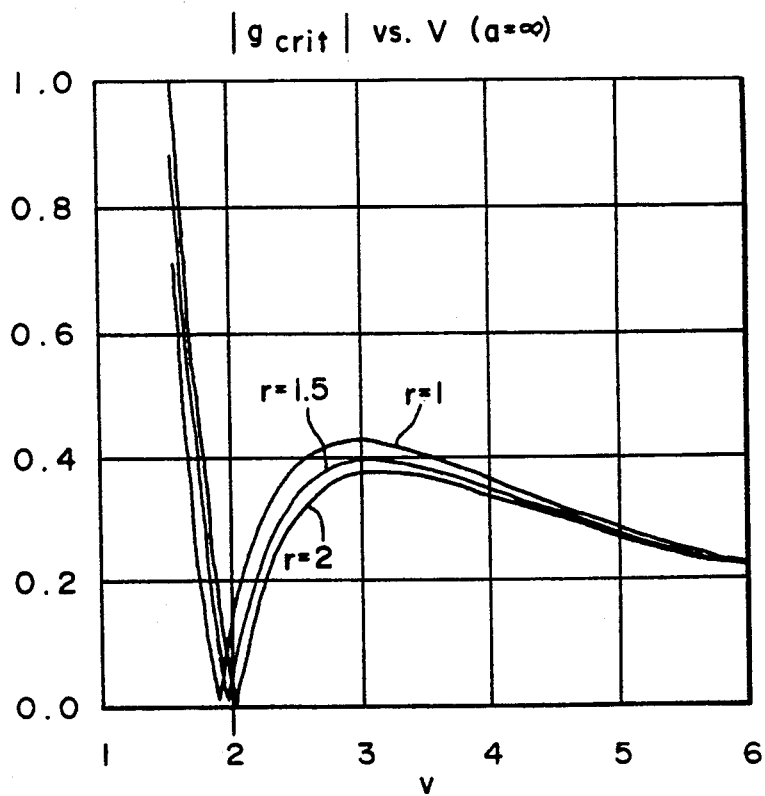
FIG.—10

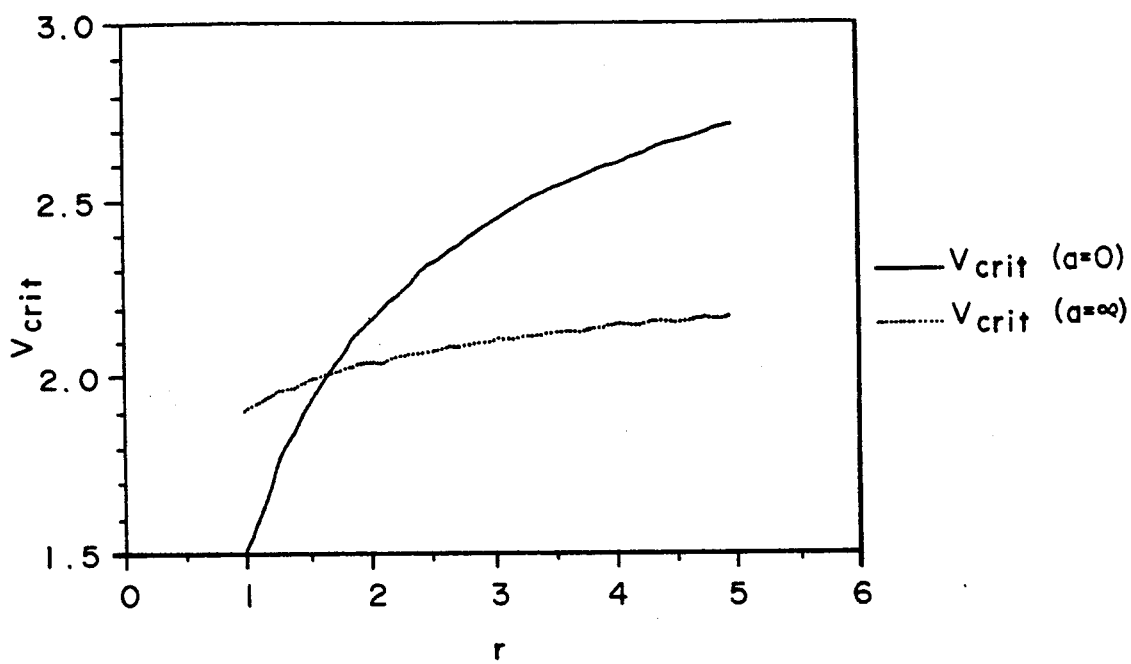
FIG.—11
g crit vs. V
(a=0, r=1)
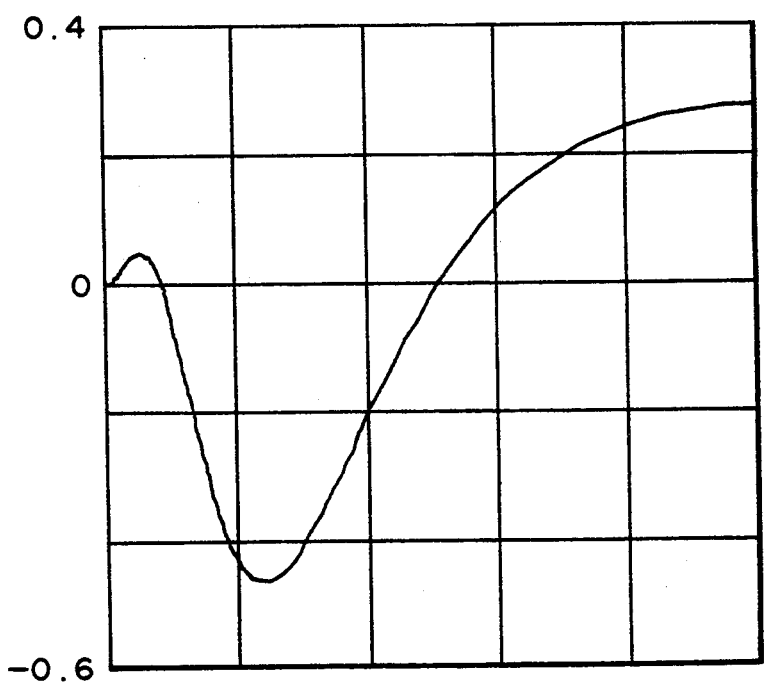
FIG.—12

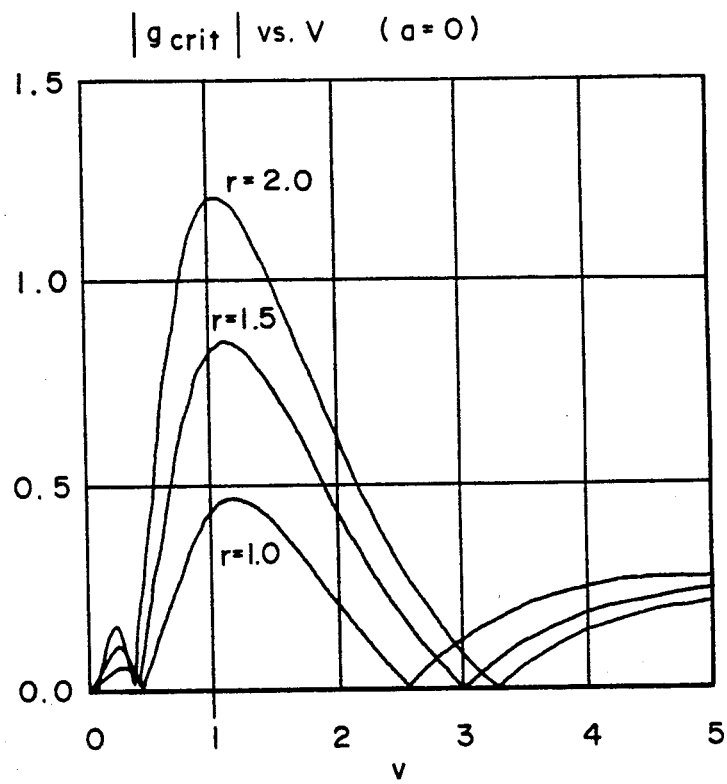
FIG.—13
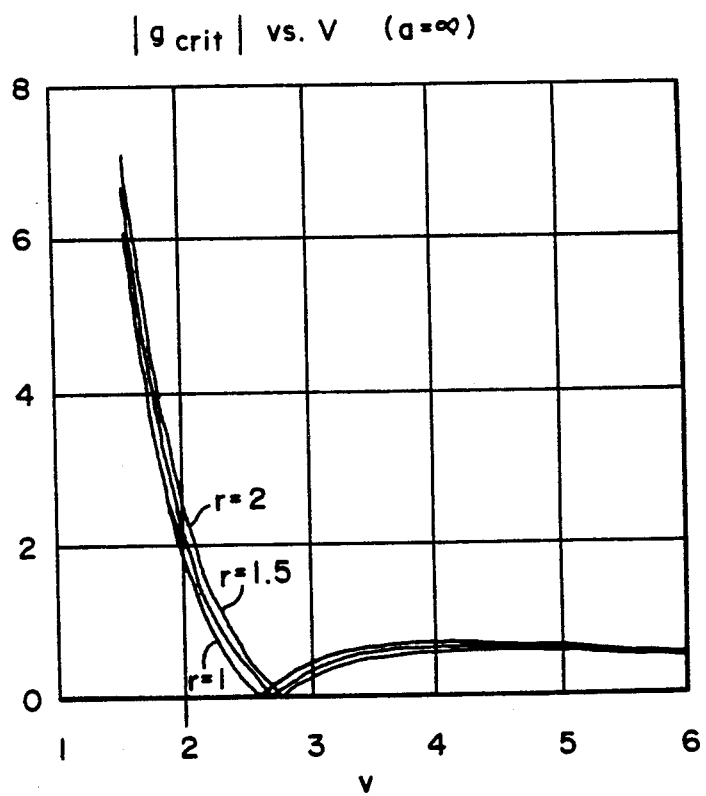
FIG.—14

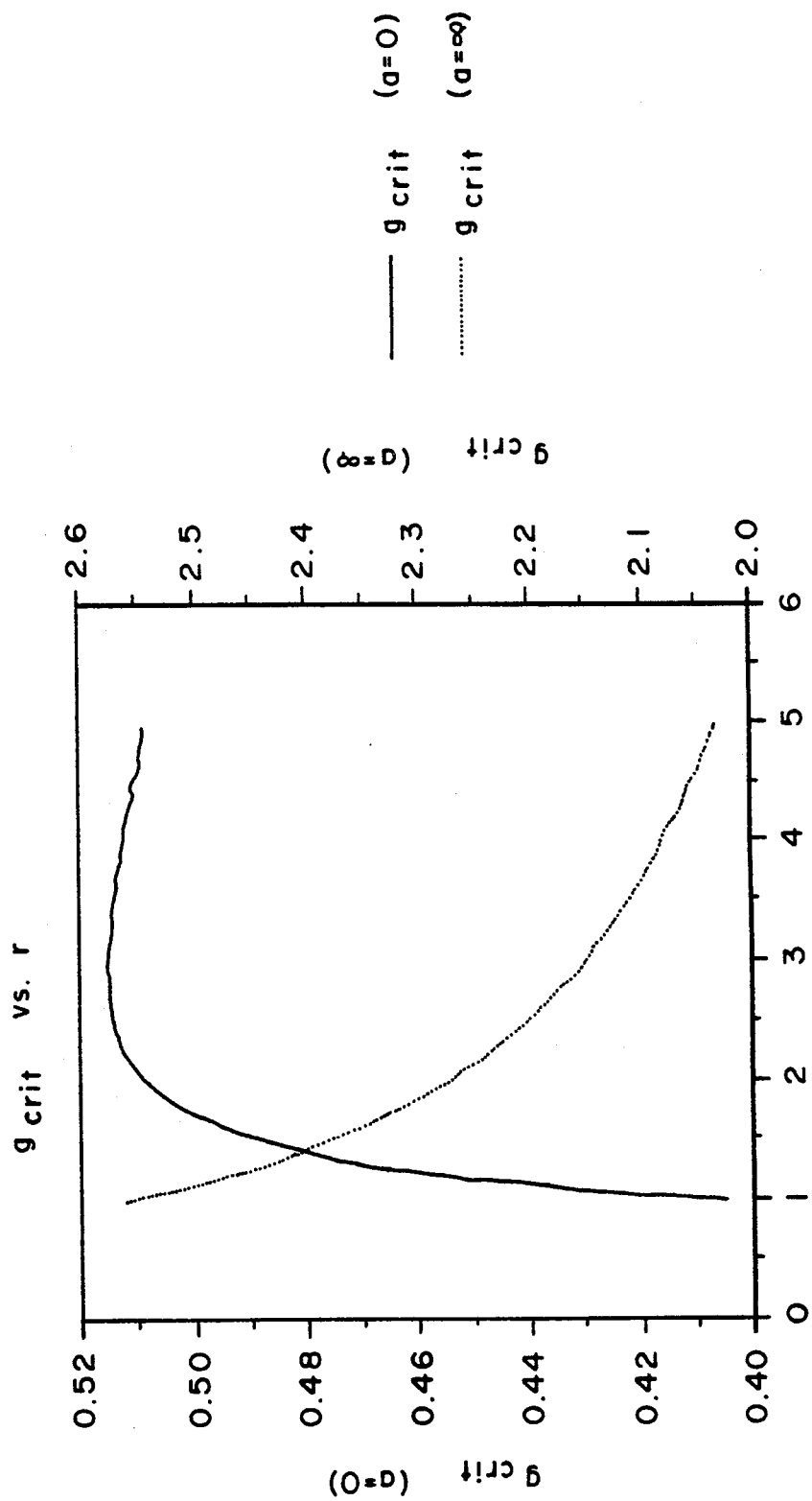
FIG.—15

WAVEGUIDE PHASEMATCHING

U.S. GOVERNMENT CONTRACTS

This invention was made with government support and the U.S. Government has certain rights to the invention.

BACKGROUND OF THE INVENTION

The present invention relates to the fabrication of dielectric waveguides and, more particularly, to a method of designing a waveguide of the type which is to propagate at least two different frequencies of optical energy. The waveguide is manufactured so that the phase mismatch between the two frequencies of optical energy has little or no first order dependence on the dimensions of the waveguide.

Dielectric waveguides, such as solid state waveguides, are used to couple energy from one frequency to another. Such solid state coupling is used for various purposes, including frequency doubling. Problems arise, though, if there are variations in the difference in the phase velocity of the corresponding modes of the waves being coupled. The amount of energy coupled between the waves is dependent upon the phase match between the two waves. In other words, the output power created by a nonlinear interaction between two waves is dependent on the effective length of such interaction. This effective length is greatest in a dielectric waveguide when the waves are in phase with one another as they travel through the waveguide. The speed of a wave through such a waveguide and, hence, velocity phasematching between two waves in the same, however, is dependent upon the waveguide dimensions. This causes significant quality control problems in producing waveguides. In this connection, it will be recognized that since each wave transmitted by a waveguide will have a multitude of succeeding cycles, even a slight variation in the phase relationship between two waves can have a dramatic effect on the output power achieved from the nonlinear interaction and, in some instances, can result in no power coupling at all.

SUMMARY OF THE INVENTION

It has been found that the output of a solid state waveguide which is to propagate optical radiation having at least two different frequencies in the direction of propagation can be controlled to be close to a chosen value by appropriately selecting dimensions for the waveguide. In its broad aspects, the fabrication method of the invention includes the steps of:

(a) determining the relationship of differences in phase of said two different frequencies for a discrete waveguide length to a plurality of potential values for a characteristic dimension of the waveguide along such length; and (b) selecting a value for the characteristic dimension which minimizes to a desired degree the effect of minor variations from the same on the coupling of energy along the length between the differing frequencies.

This "non-critical phase matching" is most desirably and simply achieved by the steps of determining and selecting including solving the equation:

$$g_1 \approx 0$$

where:

$g_1$ = the first derivative of the phase mismatch with respect to the characteristic dimension under consideration The technique is broadly applicable to any waveguide device in which variations in the difference in the phase velocity of two or more modes at different frequencies cause undesirable effects. A specific application sensitive to such effects is a waveguide frequency doubling device (e.g., for converting the infrared output of a diode laser into visible radiation) in which spatially varying differences between the phase velocities of the modes in which the fundamental and second harmonic propagate lead to spatial variations in the phasematching condition, which reduce the useful length of the device.

The terminology "optical radiation" as used herein means electromagnetic radiation in the visible wavelength spectrum and in other adjacent spectrums—typically radiation having a wavelength in the range of between 100 and 100,000 nanometers. The terminology "characteristic dimension of a waveguide" means a spatial dimension of a waveguide for more than one frequency of optical radiation along which more than one index of refraction affects such optical radiation during its propagation within the waveguide.

The invention will be described below in detail. Additional features and advantages of the same will be apparent to those skilled in the art when the following description is considered along with the drawings.

BRIEF DESCRIPTION OF THE DRAWINGS

FIGS. 1-15 of the drawings are graphs showing various relationships which aid an understanding of the mathematical analysis set forth provided for the example.

DETAILED DESCRIPTION OF THE PREFERRED EMBODIMENT

Dielectric waveguides can be idealized as structures that are invariant in at least one direction, which we call z in the remainder of this disclosure, and have an index of refraction which varies in the plane perpendicular to z, that is, in the x-y plane. Typically the waveguide has an index of refraction that is higher near the axis of the waveguide, i.e. near $x=0$ and $y=0$, and that decreases as x or y increase. The simplest waveguide is a symmetric slab waveguide, which consists of a layer of index of refraction $n_{co}$ and thickness $\rho$, surrounded by media of index of refraction $n_{cl}$, where $n_{co} > n_{cl}$. Other common types of waveguide include optical fibers, with a cylinder of radius $\rho$ and index of refraction $n_{co}$, surrounded by a medium of index of refraction $n_{cl}$, where $n_{co} > n_{cl}$, and channel waveguides with a rectangular region of thickness $\rho_x$ and width $\rho_y$ with an index of refraction $n_{co}$, surrounded by a medium of index of refraction $n_{cl}$, with $n_{co} > n_{cl}$. Similar structures with graded refractive index profiles instead of abrupt discontinuities also are used, e.g., the refractive index profile in the symmetric slab waveguide might take the form of a gaussian distribution, $$n(x) = (n_{co} - n_{cl})\exp[-(x/\rho)^2] + n_{cl}$$

Asymmetric structures are also used, where the refractive index distribution does not have a plane or axis of symmetry, e.g., the slab waveguide might have different indices of refraction in the cladding region above and below the higher index core region. Waveguides may also consist of a multiplicity of layers, for example a planar waveguide consisting of three layers of thicknesses $\rho_1$, $\rho_2$, $\rho$, and indices of refraction $n_1$, $n_2$, $n_3$, surrounded by media with indices of refraction $n_{cl}$.

In all these cases, the waveguide has one or more characteristic dimensions, which we have denoted by $\rho$, or $\rho$ with a subscript, that characterize the dimensions in the x-y plane over which the refractive index profile varies. If one or more of these characteristic dimensions depends on z, the waveguide is nonideal, and the performance of many types of devices suffers because the phase velocity of the modes depends on these dimensions.

In the most general case of interest here, we can define the phase-mismatch $\Delta\beta$ as $$\Delta\beta = \sum_{m=1}^{N} h_m \beta_m \tag{1}$$

where there are N modes involved in the interaction, the propagation constants of which are denoted here as $\beta_k$ so that the modes propagate individually as exp-$(i\beta_m z)$, and the $h_m$ represent $+1$ or $-1$ depending on the interaction being considered. An example of such a relation is second harmonic generation from a frequency $\omega$ to a frequency $2\omega$. In this case, N=3, $h_3=1$, $h_2=h_1=-1$, $\beta_3=\beta_{2\omega}$, $\beta_1=\beta_2=\beta_\omega$. Eq. (1) then becomes $$\Delta\beta = \beta_{2\omega} - 2\beta_\omega \tag{2}$$

A large class of devices operates well when $\Delta\beta$ is a constant independent of z. In phasematched interactions one attempts to have $\Delta\beta=0$, in quasi-phase-matched interactions one attempts to have $\Delta\beta=$Constant. Since the propagation constants $\beta_m$ depend on the waveguide dimensions (e.g., depth of a planar waveguide, depth and width of a channel waveguide, radius of a circular fiber, radii of an elliptical fiber) which we collectively denote as $\rho$, and on the frequency of the propagating wave in that mode, $\omega_m$, we can write $$\beta_m \equiv \beta_m(\omega_m, \rho) \tag{3}$$

and hence that $$\Delta\beta \equiv \Delta\beta(\rho) \tag{4}$$

for a particular interaction involving a particular set of frequencies. Thus, if $\rho$ depends on z, $\Delta\beta$ depends on z, and the performance of the device is degraded.

The tolerance for variations in the propagation constant, $\delta\Delta\beta$, depends on the type of device and the type of variations, but for many cases the condition $$\delta\Delta\beta_{max} < \frac{\pi}{L} \tag{5}$$

is a reasonable guideline for ensuring adequate performance of the device, where $\delta\Delta\beta_{max}$ is the maximum variation in the phase-mismatch along the device and L is the length of the device in the propagation direction.

To calculate the tolerance of the device for variations in the waveguide dimensions, consider first the case where only one dimension is changing. We can expand the phase-mismatch as a Taylor series for small variations in the waveguide dimensions, $\delta\rho$, around a mean value, $\rho_0$, $$\delta\Delta\beta = g_1 \delta\rho + \tfrac{1}{2} g_2 (\delta\rho)^2 \tag{6}$$

where $g_1$ and $g_2$ are the first and second derivatives of $\Delta\beta$ with respect to $\rho$, evaluated at $\rho=\rho_0$. When $\delta\rho$ is small, as is typically the case, one can usually calculate $\delta\Delta\beta$ from the first term in (6) alone, so that there is a linear relation between $\delta\Delta\beta$ and $\delta\rho$. In this case, if the maximum allowable variation of the phase-mismatch is $\delta\Delta\beta_{max}$, then we must have $$\delta\rho < \frac{\delta\Delta\beta_{max}}{g_1} \tag{7}$$

For the specific quality criterion given in Eq. (5), Eq. (7) reduces to $$\delta\rho < \frac{\pi}{g_1 L} \tag{8}$$

Notice that the allowable dimensional variations decrease linearly with increasing L.

These tolerances can in practice be difficult to meet. In keeping with the invention, the adverse effects of dimensional variation can be minimized if a waveguide with $g_1 \approx 0$ is fabricated with the linear term in Eq. (6) small so that the second term becomes the more important. In this case, $\delta\Delta\beta$ depends $(\delta\rho)^2$, so that Eqs. (7) and (8) for the tolerances for dimensional variations are replaced by $$\delta\rho < \sqrt{\frac{2\delta\Delta\beta_{max}}{g_2}} \tag{9}$$

and $$\delta\rho < \sqrt{\frac{2\pi}{g_2 L}} \tag{10}$$

Notice that the allowable dimensional variation now scales as only the square root of the length, so that longer devices can be built without excessive effects due to dimensional variations. Choosing $\rho_0$ so that $g_1(\rho_0) \approx 0$ is then clearly desirable, and can be termed noncritical phasematching.

The paper by Burns et al. entitled "Noncritical Phasematching in Optical Waveguides," appearing in Vol. 22 of *Applied Physics Letters*, p. 143 (1973), discusses tolerances for dimensional errors in waveguides used for second harmonic generation, but teaches away from the invention, that is, the paper puts ancillary conditions on the problem that leads to the conclusion and specific statement that noncritical phasematching is only possible when:

(a) The thickness of the waveguide is much smaller than the wavelength of light.

(b) All the modes involved in the interaction must be close to cutoff.

(c) Orthogonally polarized modes must be used.

(d) Only nonlinear susceptibilities that couple orthogonally polarized radiation are of use in noncritically phasematched interactions.

These conditions, unfortunately, eliminate essentially any useful implementation of phasematched waveguide devices, since (a) and (b) lead to very poorly confined modes that interact inefficiently, especially for nonlinear interactions, (c) eliminates the use of waveguides that transmit only one polarization of light, and (c) and (d) both preclude use of what are often the largest nonlinear coefficients, e.g., those like $d_{33}$ lithium niobate that couple modes of the same polarization. Thus, no practical devices using this noncritical phasematching have been demonstrated in the 20 years since the publication of the paper. In fact, the tight constraints on $\delta \rho$ imposed when $g_1 \neq 0$ have led many to question the practicality of phasematched waveguide interactions for many applications. It is believed that these constraints are necessary. See George I. Stegeman et al., "Nonlinear Integrated Optics," *J. Appl. Phys.*, Vol. 58, p. R57 (1985).

It has been found that none of the constraints (a)–(d) is necessary by considering a more general class of solutions to the condition $g_1(\rho_0) \approx 0$,. One can in fact find solutions that simultaneously violate all four of these conditions. Waveguides designed by the inventive procedure can operate well away from cutoff and thus have well confined modes (especially important for good nonlinear efficiencies), allow the use of waveguides like proton exchange in lithium niobate that support only modes of one polarization, and allow the use of nonlinear susceptibilities that couple parallel polarized modes.

The error that led to constraints (a)–(d) was to try and obtain simultaneously a solution to $g_1(\rho_0) \approx 0$ and $\Delta\beta(\rho_0)=0$, the latter condition arising from the need in the nonlinear interaction that Burns considered to achieve phasematching in media with no birefringence. If one eliminates the need to achieve $\Delta\beta(\rho_0)=0$ (e.g., by quasiphasematching), or if one achieves $\Delta\beta(\rho_0)=0$ by use of means not tied to modal dispersion (e.g., the use of birefringent media to accomplish phasematching), conditions (a)–(d) no longer are necessary for noncritical phasematching.

Calculation of the condition $g_1(\rho_0) \approx 0$ is illustrated below for a prototype case, second harmonic generation in step-index-profile waveguide. It is shown there that solutions violating (a)–(d) are readily obtained, and typically lead to at least an order of magnitude increase in the tolerable $\delta\rho$ compared to designs using $g_1 \neq 0$. Solutions for other types of waveguides such as gaussian profile, exponential profile, and error function profiles have also been found, and show similar general trends to the step index case presented here. These solutions have much better behavior in terms of confinement and polarization selection rules than the Burns solutions, as discussed above.

It is of course not necessary to operate precisely at the point $\rho_0$ where $g_1(\rho_0)=0$. Values of $\rho$ close to $\rho_0$ will produce most of the benefits of operation at $\rho=\rho_0$. More specifically, if the tolerance for dimensional variations $\delta\rho$ at the optimum operating point $\rho_0$ is $\delta\rho_0$, the tolerance at some nearby operating point $\rho$ can be approximated by $$\frac{\delta\rho}{\delta\rho_0} \approx \frac{-(\rho-\rho_0)}{\delta\rho_0} + \sqrt{\left[\frac{-(\rho-\rho_0)}{\delta\rho_0}\right]^2 + 1} \tag{11}$$

There is no precise point where this method ceases to be useful—it simply gets monotonically worse as one moves away from the optimum dimension $\rho=\rho_0$. In the range where the approximation in Eq. (11) is valid, if the operating point differs from the ideal operating point $\rho_0$ by an amount greater than twice the tolerance at the ideal point, that is, if $$\rho-\rho_0 > 2\delta\rho_0 \tag{12}$$

then the tolerance at that operating point will be less than $\frac{1}{4}$ that at the optimum.

This document sets forth so far a technique for reducing the sensitivity of a waveguide device to variations in one of the characteristic dimensions. If it is desired to reduce the sensitivity to variations in two or more dimensions simultaneously, the approach is similar to that described above, but there will be a set of conditions that must be satisfied simultaneously, i.e., the derivative of $\Delta\beta$ with respect to each of the dimensions to which sensitivity is to be reduced must vanish. For example, in a channel waveguide:

$$g_{1x} \equiv \frac{\partial \Delta\beta}{\partial \rho_x} = 0 \text{ and } g_{1y} \equiv \frac{\partial \Delta\beta}{\partial \rho_y} = 0 \tag{10.5}$$

where the $\rho_x$ and $\rho_y$ are the characteristic dimensions of the channel waveguide defined above.

The invention then is a design approach to waveguide devices whose phase-mismatch has no first order dependence or a weak first order dependence on the dimension(s) of the waveguide. This technique is appropriate for any guided wave interaction that suffers when the phase-mismatch varies along the length of the device, especially nonlinear frequency convertors like second harmonic generators, sum and difference frequency generators, and parametric amplifiers and oscillators.

The example below provides a calculation for a prototype case, second harmonic generation in step-indexed-profile waveguides.

EXAMPLE

In this example, the paper "Scaling rules for thin-film optical waveguides," written by H. Kogelnik and V. Ramaswamy (Applied Optics, vol. 13, pp. 1857–1862, 1974), is referred to frequently. Hereafter this paper is referred to as "K&R".

The normalized frequency or film thickness (depth) V is defined as (K&R eq. 1):

$$V = k\rho (n_f^2 - n_s^2)^{\frac{1}{2}}$$

The normalized guide index b is defined as (K&R eq. 6):

$$b = \frac{N^2 - n_s^2}{n_f^2 - n_s^2}$$

The asymmetry measure a is defined as (K&R eq. 10):

$$a = \frac{n_s^2 - n_c^2}{n_f^2 - n_s^2}$$

The normalized guide thickness W is defined as (K&R eq. 23):

$$W = V + \frac{1}{\sqrt{b}} + \frac{1}{\sqrt{b+a}}$$

The output of a nonlinear interaction is proportional to $$\text{sinc}^2\left(\frac{(\Delta\beta)L}{2}\right)$$

A typical phasematching requirement is:

$$\frac{(\Delta\beta)L}{2} \leq \frac{\pi}{2} \text{ or } \Delta\beta \leq \frac{\pi}{L}$$

Let us expand $\Delta\beta$ with respect to the waveguide thickness (depth) $\rho$ to second order:

$$\Delta\beta = (\Delta\beta)_0 + \frac{\partial}{\partial\rho}(\Delta\beta)(\Delta\rho) + \frac{1}{2}\frac{\partial^2}{\partial\rho^2}(\Delta\beta)(\Delta\rho)^2$$

We assume that the interaction is phasematched, so $$(\Delta\beta)_0 = 0$$

When $$\frac{\partial}{\partial\rho}(\Delta\beta) \neq 0$$

we say the interaction is "critically" phasematched. We use the first derivative term of the Taylor expansion to determine the phasematching tolerance:

$$\Delta\beta \approx \frac{\partial}{\partial\rho}(\Delta\beta)(\Delta\rho) \leq \frac{\pi}{L}$$

The interaction is "noncritically" phasematched if $$\frac{\partial}{\partial\rho}(\Delta\beta) = 0$$

Under this condition we must move to the second derivative term to find the phasematching tolerance:

$$\Delta\beta \approx \frac{1}{2}\frac{\partial^2}{\partial\rho^2}(\Delta\beta)(\Delta\rho)^2 \leq \frac{\pi}{L}$$

Critical Phasematching

For second harmonic generation in a waveguide, $$\Delta\beta_{\text{eff}} = \frac{4\pi}{\lambda_\omega}(N_{2\omega} - N_\omega)$$

In order to determine $\partial(\Delta\beta)/\partial\rho$, we thus need to find an expression for the derivative of the effective index N with respect to the waveguide thickness $\rho$:

$$\frac{\partial N}{\partial \rho}$$

Then we will be able to evaluate:

$$\frac{\partial}{\partial\rho}(\Delta\beta_{\text{eff}}) = \frac{4\pi}{\lambda_\omega}\left(\frac{\partial}{\partial\rho}N_{2\omega} - \frac{\partial}{\partial\rho}N_\omega\right)$$

For small index difference between film and substrate (K&R eq. 7), and assuming an analysis for TE modes:

$$N = n_s + b(n_f - n_s)$$

$$\frac{\partial N}{\partial\rho} = (n_f - n_s)\frac{\partial}{\partial\rho}b(\rho)$$

Now we use the chain rule to write:

$$\frac{\partial N}{\partial\rho} = (n_f - n_s)\frac{\partial b}{\partial\rho} = (n_f - n_s)\frac{\partial V}{\partial\rho}\frac{\partial b}{\partial V}$$

The derivative of the normalized film thickness (depth) V is simple:

$$\frac{\partial V}{\partial\rho} = \frac{\partial}{\partial\rho}k\rho\sqrt{n_f^2 - n_s^2} = k\sqrt{n_f^2 - n_s^2} = \frac{V}{\rho}$$

The expression which results from the substitution of the derivative is:

$$\frac{\partial N}{\partial\rho} = (n_f - n_s)\left(\frac{V}{\rho}\right)\frac{\partial b}{\partial V}$$

We can define $(\partial N/\partial\rho)_{\text{env}}$ which describes the "envelope" or general form of the derivative.

$$\left(\frac{\partial N}{\partial\rho}\right)_{\text{env}} = V\frac{\partial b}{\partial V}$$

Then we have the equation, still general $$\frac{\partial N}{\partial\rho} = \frac{(n_f - n_s)}{\rho}\left(\frac{\partial N}{\partial\rho}\right)_{\text{env}}$$

Now for the other derivative $\partial b/\partial V$ we must use the eigenvalue equation for a planar waveguide which links b and V, (K&R eq. 16):

$$\frac{\partial b}{\partial V} = \frac{2(1-b)}{W}$$

Where W is the normalized guide thickness. Thus the envelope function is:

$$\left(\frac{\partial N}{\partial\rho}\right)_{\text{env}} = \frac{2V(1-b)}{W}$$

We plot the envelope function as a function of V for $a=0$ and $a=\infty$ in the graphs of FIGS. 5 and 7.

Using the waveguide-specific envelope function, now the derivative of the effective index N can be written:

$$\frac{\partial N}{\partial\rho} = \frac{(n_f - n_s)}{\rho}\left(\frac{\partial N}{\partial\rho}\right)_{\text{env}} = \frac{(n_f - n_s)}{\rho}\frac{2V(1-b)}{W}$$

This expression can be evaluated numerically in a straightforward fashion.

Phasematching Tolerance for Critical Phasematching $$\frac{\partial}{\partial \rho}(\Delta\beta_{eff}) = \frac{4\pi}{\lambda_\omega}\left(\frac{\partial}{\partial \rho}N_{2\omega} - \frac{\partial}{\partial \rho}N_\omega\right)$$

$$\frac{\partial}{\partial \rho}(\Delta\beta_{eff}) = \frac{4\pi}{\lambda_\omega}\left(\left(\frac{(n_f - n_s)}{\rho}\left(\frac{\partial N}{\partial \rho}\right)_{env}\right)\bigg|_{freq=2\omega} - \left(\frac{(n_f - n_s)}{\rho}\left(\frac{\partial N}{\partial \rho}\right)_{env}\right)\bigg|_{freq=\omega}\right)$$

$$\frac{\partial}{\partial \rho}(\Delta\beta_{eff}) = \frac{4\pi}{\rho\lambda_\omega}\left((n_{f\_sh} - n_{s\_sh})\left(\frac{\partial N}{\partial \rho}\right)_{env\_sh} - (n_{f\_fu} - n_{s\_fu})\left(\frac{\partial N}{\partial \rho}\right)_{env\_fu}\right)$$

Let $$\Delta n_{sh} = n_{f\_sh} - n_{s\_sh}$$

$$\Delta n_{fu} = n_{f\_fu} - n_{s\_fu}$$

and the derivative expression becomes:

$$\frac{\partial}{\partial \rho}(\Delta\beta_{eff}) = \frac{4\pi}{\rho\lambda_\omega}\left(\Delta n_{sh}\left(\frac{\partial N}{\partial \rho}\right)_{env\_sh} - \Delta n_{fu}\left(\frac{\partial N}{\partial \rho}\right)_{env\_fu}\right)$$

Now define a ratio r:

$$r = \frac{\Delta n_{sh}}{\Delta n_{fu}}$$

Then $$\frac{\partial}{\partial \rho}(\Delta\beta_{eff}) = \frac{4\pi}{\rho\lambda_\omega}(\Delta n_{fu})\left(r\left(\frac{\partial N}{\partial \rho}\right)_{env\_sh} - \left(\frac{\partial N}{\partial \rho}\right)_{env\_fu}\right)$$

We point out that if we neglect material dispersion in the film and substrate layers but still allow dispersion in $\Delta n$, then $V\_sh$ and $V\_fu$ are simply related:

$$V_{sh} = 2V_{fu}\sqrt{r}$$

(If we take into account material dispersion the math will become harder, but the general trends should still hold.)

Now let us define a function g_crit(V,r), a dimensionless quantity which describes the derivative:

$$g_{crit}(V_{fu}, r) = r\left(\frac{\partial N}{\partial \rho}\right)_{env\_sh} - \left(\frac{\partial N}{\partial \rho}\right)_{env\_fu}$$

With this substitution, the derivative becomes:

$$\frac{\partial}{\partial \rho}(\Delta\beta_{eff}) = \frac{4\pi}{\rho\lambda_\omega}(\Delta n_{fu})g_{crit}(V_{fu}, r)$$

Now recall the phasematching tolerance for critical phasematching:

$$\Delta\beta \approx \frac{\partial}{\partial \rho}(\Delta\beta)(\Delta\rho) \leq \frac{\pi}{L}$$

2Substituting the expression above for $\partial(\Delta\beta)/\partial\rho$ gives:

$$(\Delta\rho)\frac{1}{\rho}((\Delta n_{fu})g_{crit})\frac{4\pi}{\lambda_\omega} \leq \frac{\pi}{L}$$

$$\frac{(\Delta\rho)}{\rho} \leq \left(\frac{\lambda_\omega}{4L\Delta n_{fu}}\right)\frac{1}{g_{crit}}$$

$$\frac{(\Delta\rho)L}{\rho} \leq \left(\frac{\lambda_\omega}{4\Delta n_{fu}}\right)\frac{1}{g_{crit}}$$

For the planar step-index waveguide considered here, $$g_{crit}(V_{fu}, r) = r\left(\frac{\partial N}{\partial \rho}\right)_{env\_sh} - \left(\frac{\partial N}{\partial \rho}\right)_{env\_fu} =$$

$$r\left(\frac{2V_{sh}(1 - b_{sh})}{W_{sh}}\right) - \frac{2V_{fu}(1 - b_{fu})}{W_{fu}}$$

The graphs of FIGS. 9 and 10 show plots of g_crit(V) for various values of r, for $a=0$ and $a=\infty$, respectively. Suppose we want to model our lithium niobate APE planar waveguides as step index waveguides. We can estimate a $\Delta n$ of 0.003, and a $V \sim 3.5$ for a thickness of about 4 μm. For a fundamental wavelength of $\sim 1$ μm, $$\frac{(\Delta\rho)L}{\rho} \leq \left(\frac{\lambda_\omega}{4\Delta n_{fu}}\right)\frac{1}{g_c} = \left(\frac{1.0 \ \mu m}{4.0(0.003)}\right)\frac{1}{g_c} = \frac{83.3333 \ \mu m}{g_c}$$

Referring to the graphs, we find that g_crit for $V=3.5$ is about 0.2 or 0.4, for $a=0$ and $a=\infty$, respectively. Using 0.4, $$\frac{(\Delta\rho)L}{\rho} \leq \frac{83.3333 \ \mu m}{0.4} = 208.333 \ \mu m$$

For a length of L=1 cm, the tolerance of $\Delta\rho/\rho$ is thus about 2%.

Noncritical Phasematching

Recall the condition for noncritical phasematching:

$$\frac{\partial}{\partial \rho}(\Delta\beta) = 0$$

For the derivative to be zero, we want the function g_crit defined in the previous section to be zero:

$$g_{crit}(V_{fu}, r) = r\left(\frac{\partial N}{\partial \rho}\right)_{env\_sh} - \left(\frac{\partial N}{\partial \rho}\right)_{env\_fu} = 0$$

Which, for the planar step-index guide, is:

$$g_{crit}(V_{fu}, r) = r\left(\frac{2V_{sh}(1 - b_{sh})}{W_{sh}}\right) - \frac{2V_{fu}(1 - b_{fu})}{W_f} = 0$$

We can plot this function as a function of V (and thus, of film thickness). The asymmetry parameters of interest are a=0 (for channel waveguide width) and a=∞ (for waveguide depth). The reader is directed to the graphs of FIGS. 9 and 10 for these cases.

For r=1 and a=0 we find a zero at V~1.5, while for a=∞ we find a zero at V~2. To check the operation of the computer program, one can use FIGS. 3 and 4 of K&R to verify that the locations of the zeroes are correct. The graph of FIG. 11 shows plots of V_nc vs. r for a=0 and a=∞.

Phasematching Tolerance for Noncritical Phasematching

The phasematching tolerance is specified by the equation:

$$\Delta\beta \approx \frac{1}{2} \frac{\partial^2}{\partial \rho^2}(\Delta\beta)(\Delta\rho)^2 \leq \frac{\pi}{L}$$

Thus we need an expression for the second derivative of $\Delta\beta$:

$$\frac{\partial^2}{\partial \rho^2}(\Delta\beta) = \frac{\partial^2}{\partial \rho^2}(\Delta\beta_{eff}) = \frac{\partial^2}{\partial \rho^2}\left(\frac{4\pi}{\lambda_\omega}(N_{2\omega} - N_\omega)\right) =$$

$$\frac{4\pi}{\lambda_\omega}\left(\frac{\partial^2}{\partial \rho^2}N_{2\omega} - \frac{\partial^2}{\partial \rho^2}N_\omega\right)$$

In turn, we need to find the second derivative of the effective index N. Again using the K&R definition of N, we can write:

$$N = n_s + b(n_f - n_s)$$

$$\frac{\partial^2 N}{\partial \rho^2} = (n_f - n_s)\frac{\partial^2 b}{\partial \rho^2}$$

Applying the chain rule twice results in:

$$\frac{\partial^2 N}{\partial \rho^2} = (n_f - n_s)\frac{\partial V}{\partial \rho} \frac{\partial}{\partial V}\left(\frac{\partial V}{\partial \rho} \frac{\partial b}{\partial v}\right)$$

Using the fact that $\partial V/\partial \rho = V/\rho$ gives:

$$\frac{\partial^2 N}{\partial \rho^2} = (n_f - n_s)\frac{V}{\rho} \frac{\partial}{\partial V}\left(\frac{V}{\rho} \frac{\partial b}{\partial V}\right)$$

The quantity (V/ρ) is independent of V, so we can move it past the V derivative:

$$\frac{\partial^2 N}{\partial \rho^2} = (n_f - n_s)\frac{V^2}{\rho^2} \frac{\partial}{\partial V}\left(\frac{\partial b}{\partial V}\right) = (n_f - n_s)\frac{V^2}{\rho^2} \frac{\partial^2 b}{\partial V^2}$$

In analogy to the critical phasematching case described above, we can define an "envelope" quantity $$\left(\frac{\partial^2 N}{\partial \rho^2}\right)_{env} = V^2 \frac{\partial^2 b}{\partial V^2}$$

so that $$\frac{\partial^2 N}{\partial \rho^2} = \frac{n_f - n_s}{\rho^2}\left(\frac{\partial^2 N}{\partial \rho^2}\right)_{env}$$

$$\frac{\partial^2}{\partial \rho^2}(\Delta\beta) = \frac{4\pi}{\lambda_\omega}\left(\left(\frac{n_f - n_s}{\rho^2}\left(\frac{\partial^2 N}{\partial \rho^2}\right)_{env}\right)_{sh} - \left(\frac{n_f - n_s}{\rho^2}\left(\frac{\partial^2 N}{\partial \rho^2}\right)_{env}\right)_{fu}\right)$$

Following the critical phasematching analysis and using the ratio r:

$$\frac{\partial^2}{\partial \rho^2}(\Delta\beta) =$$

$$\frac{4\pi}{\lambda_\omega} \frac{(\Delta n_{fu})}{\rho^2}\left(r\left(\frac{\partial^2 N}{\partial \rho^2}\right)_{env\_sh} - \left(\frac{\partial^2 N}{\partial \rho^2}\right)_{env\_fu}\right)$$

We can define a g_ncrit(V,r):

$$g_{ncrit}(V_{fu}, r) = r\left(\frac{\partial^2 N}{\partial \rho^2}\right)_{env\_sh} - \left(\frac{\partial^2 N}{\partial \rho^2}\right)_{env\_fu}$$

So that the derivative term is now:

$$\frac{\partial^2}{\partial \rho^2}(\Delta\beta) = \frac{4\pi}{\lambda_\omega} \frac{(\Delta n_{fu})}{\rho^2} g_{ncrit}(V_{fu}, r)$$

Recall the phasematching tolerance expression for noncritical phasematching:

$$\Delta\beta \approx \frac{1}{2} \frac{\partial^2}{\partial \rho^2}(\Delta\beta)(\Delta\rho)^2 \leq \frac{\pi}{L}$$

Substitution of the derivative expression gives:

$$\Delta\beta \approx \frac{2\pi(\Delta n_{fu})g_{ncrit}(V_{fu}, r)}{\lambda_\omega \rho^2}(\Delta\rho)^2 \leq \frac{\pi}{L}$$

Algebraic manipulation yields $$\frac{\Delta\rho}{\rho} \leq \left(\frac{\lambda_\omega}{2L\Delta n_{fu}g_{ncrit}}\right)^{\frac{1}{2}}$$

or

-continued $$\frac{\Delta\rho}{\rho} \sqrt{L} \leq \sqrt{\left(\frac{\lambda_\omega}{2\Delta n_{fu}}\right)\frac{1}{g_{ncrit}}}$$

Now we will find an expression for the envelope quantity and the corresponding g_ncrit specific to the slab waveguide.

For the slab waveguide we have an expression for $\partial b/\partial V$:

$$\frac{\partial}{\partial V} b(V) = \frac{2(1 - b(V))}{W(V)}$$

$$\frac{\partial}{\partial V}\left(\frac{\partial}{\partial V} b(V)\right) = \frac{\partial}{\partial V}\left(\frac{2(1 - b(V))}{W(V)}\right) =$$

$$\frac{-2W(V)\frac{\partial}{\partial V} b(V) - 2(1 - b(V))\frac{\partial}{\partial V} W(V)}{W(V)^2}$$

Using $$\frac{\partial}{\partial V} W(V) = \frac{\partial}{\partial V}\left(V + \frac{1}{\sqrt{b(V)}} + \frac{1}{\sqrt{b(V) + a}}\right) =$$

$$-\frac{b(V)^{-3/2}\frac{\partial}{\partial V} b(V)}{2} - \frac{(b(V) + a)^{-3/2}\frac{\partial}{\partial V} b(V)}{2} + 1$$

and some algebraic manipulation, one finally achieves the expression:

$$\frac{\partial}{\partial V}\left(\frac{\partial}{\partial V} b(V)\right) =$$

$$\frac{2(1 - b(V))}{W(V)^2}\left(\frac{(1 - b(V))(b(V)^{-3/2} + (b(V) + a)^{-3/2})}{W(V)} - 3\right)$$

or, just taking out the "function of V" notation for ease of reading:

$$\frac{\partial}{\partial V}\left(\frac{\partial b}{\partial V}\right) =$$

$$\frac{2(1 - b)}{W^2}\left(\frac{(1 - b)(b^{-3/2} + (b + a)^{-3/2})}{W} - 3\right)$$

This quantity is plotted in the graphs of FIGS. 2 and 4. Turning to the envelope quantity now:

$$\left(\frac{\partial^2 N}{\partial \rho^2}\right)_{env} =$$

$$\frac{2V^2(1 - b)}{W^2}\left(\frac{(1 - b)(b^{-3/2} + (b + a)^{-3/2})}{W} - 3\right)$$

The envelope quantities are plotted in the graphs of FIGS. 6 and 8. Recalling the expressions $$g_{ncrit}(V_{fu}, r) = r\left(\frac{\partial^2 N}{\partial \rho^2}\right)_{env\_sh} - \left(\frac{\partial^2 N}{\partial \rho^2}\right)_{env\_fu}$$

$$V_{sh} = 2V_{fu}\sqrt{r}$$

we can plot g_ncrit vs. V_fu for various r and for a=0 and a=∞. We have done this in the graphs of FIGS. 12, 13 and 14.

In the graph of FIG. 15 we have plotted g_ncrit vs. r. At each value of r we have determined V_ncrit and evaluated g_ncrit at that value. For design work, the graphs of FIGS. 11 and 15 should be the easiest to use.

Let's say we are operating at 1 μm, Δn=0.003, and a=∞, so that the r doesn't matter so much. If we are critically phasematched at V=2, then g_ncrit(V=2)=2, and the tolerance is:

$$\frac{\Delta\rho}{\rho} \sqrt{L} \leq \sqrt{\left(\frac{\lambda_\omega}{2\Delta n_{fu}}\right)\frac{1}{g_{ncrit}}} =$$

$$\sqrt{\left(\frac{1.0 \ \mu m}{2(0.003)}\right)\frac{1}{2.0}} = 9.12871 \sqrt{\mu m}$$

So for L=1 cm, the tolerance is:

$$\frac{\Delta\rho}{\rho} = \frac{1}{\sqrt{10000.0 \ \mu m}} 9.12871 \sqrt{\mu m}$$

$$\frac{\Delta\rho}{\rho} \leq \frac{1}{\sqrt{10000.0 \ \mu m}} 9.12871 \sqrt{\mu m} = 0.0912871 = 10\%$$

which is five times larger than the critically phasematched case discussed earlier.

This analysis can be extended to step index profiles with large film-substrate index differences, and to TM modes as well as TE modes. We have chosen the small index difference, TE case as an example, because the math is simple. The analysis could also be generalized to other profiles besides the step index, and to channel waveguides or fibers, not just planar guides.

The invention has been described in detail in connection with a preferred embodiment. Many changes and variations can be made and will be obvious to those of ordinary skill in the art. It is therefore intended that the coverage afforded Applicants be only defined by the claims and their equivalents.

What is claimed is:

1. In a method of manufacturing a dielectric waveguide which is to propagate optical radiation having at least two different frequencies in the direction of said propagation, the steps of
    (a) determining the relationship of differences in phase of said two different frequencies for a discrete length of said waveguide to a plurality of potential values for a characteristic dimension of said waveguide along said discrete length; and
    (b) selecting a value for said characteristic dimension which minimizes to a desired degree the effect of minor variations from the same on the coupling of energy along said length between said differing frequencies.

2. The method of claim 1 wherein said steps of determining and selecting are performed for all of the characteristic dimensions of said waveguide.

3. The method of claim 1 wherein said step of selecting said value for said characteristic dimension includes selecting the same to minimize the difference in said phases over said length.

4. The method of claim 1 wherein said step of selecting said characteristic dimension includes selecting a predetermined constant difference between said phases.

5. A dielectric waveguide made according to the method of any of the method claims.

6. The method of claim 1 wherein said steps of determining and selecting include solving the equation $$g_1 \approx 0$$

where: $g_1$ = the first derivative of the phase mismatch with respect to the characteristic dimension under consideration.

* * * * *